No. 765,968. PATENTED JULY 26, 1904.
W. M. GIBBS.
SEEDING MACHINE.
APPLICATION FILED AUG. 5, 1903.
NO MODEL. 2 SHEETS—SHEET 1.
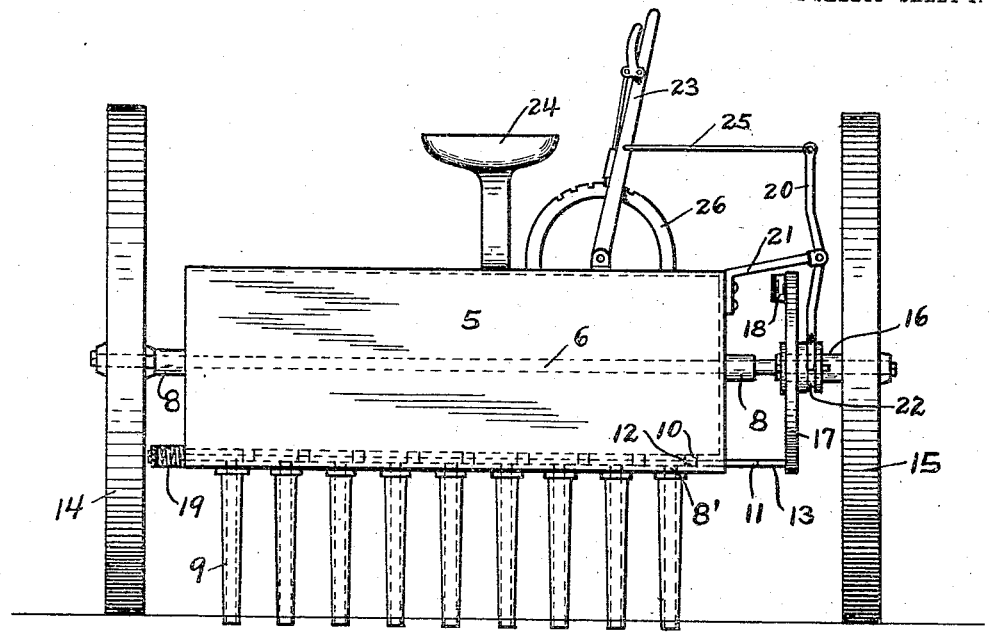
Fig. 1.
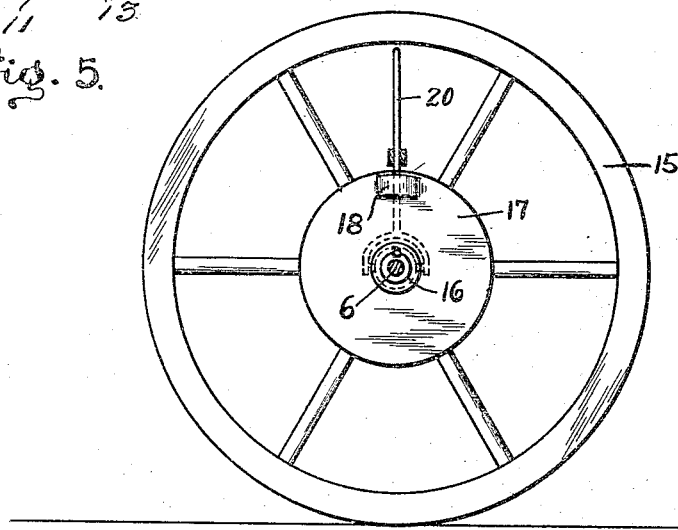
Fig. 5.
Fig. 3.
Witnesses
Charles Morgan,
Inventor
W. M. GIBBS.
by
Attorneys No. 765,968. Patented July 26, 1904.

UNITED STATES PATENT OFFICE.

WILLIAM M. GIBBS, OF PROVIDENCE, UTAH.

SEEDING-MACHINE.

SPECIFICATION forming part of Letters Patent No. 765,968, dated July 26, 1904.

Application filed August 5, 1903. Serial No. 168,334. (No model.)

*To all whom it may concern:*

Be it known that I, WILLIAM M. GIBBS, a citizen of the United States, residing at Providence, in the county of Cache, State of Utah, have invented certain new and useful Improvements in Seeding-Machines; and I do hereby declare the following to be a full, clear, and exact description of the invention, such as will enable others skilled in the art to which it appertains to make and use the same.

This invention relates to seeding-machines, and more particularly to machines for planting beet-seeds, the object of the invention being to provide a machine with which the seeds may be deposited at regular intervals and in proper quantity with accuracy.

A further object of the invention is to provide a simple means for varying the quantity of seeds deposited in each hill and to provide a machine which will comprise a minimum number of parts and which will be cheap and simple of manufacture.

Figure 2:
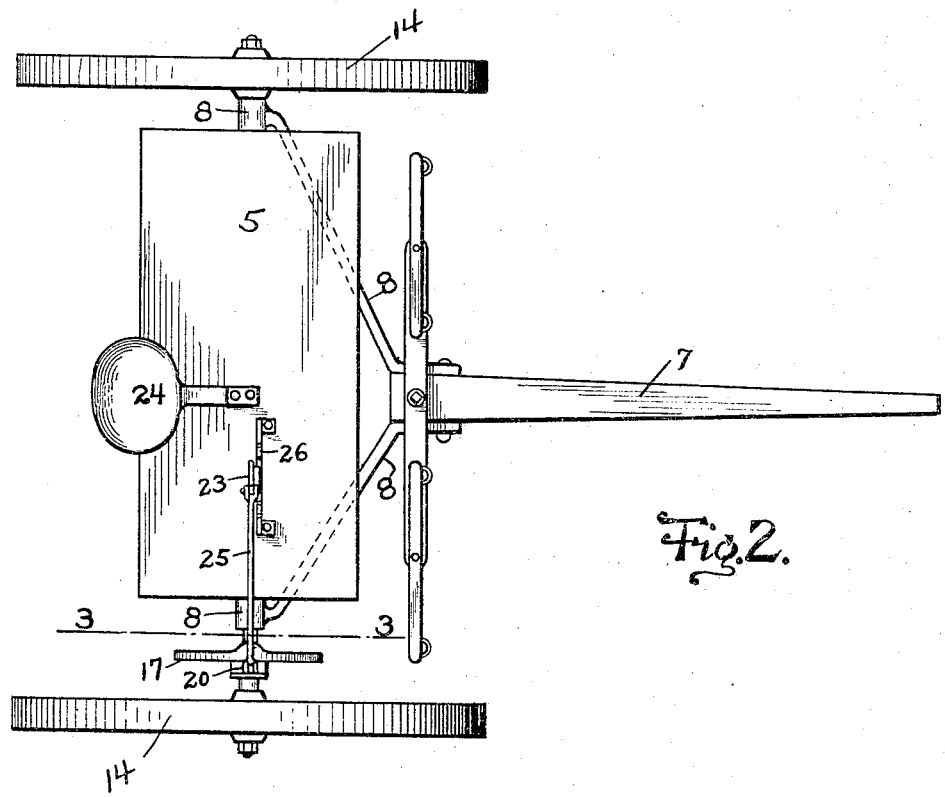
Figure 4:
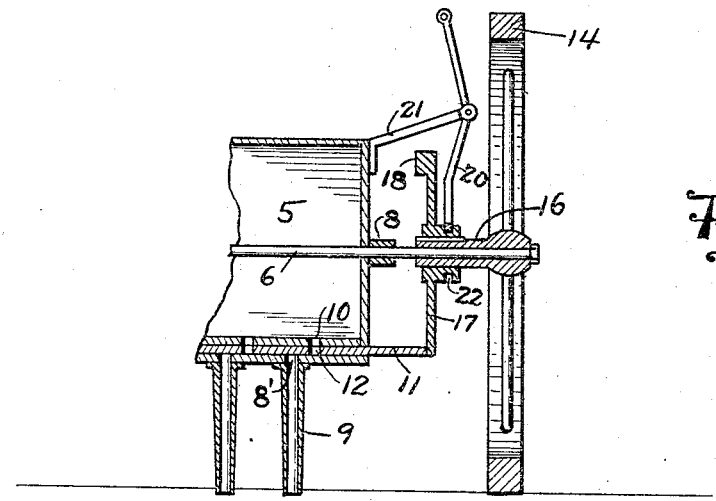

In the drawings forming a portion of this specification and in which like numerals of reference indicate similar parts in the several views, Figure 1 is a rear elevation of an implement embodying the present invention. Fig. 2 is a top plan view of the implement. Fig. 3 is a section on line 3 3 of Fig. 2, showing the operating-wheel in elevation. Fig. 4 is a vertical section taken longitudinally through one end portion of the implement and including the operating-wheel and its cam. Fig. 5 is a plan view of the outer end portion of the slide 11, showing the bevel thereof.

Referring now to the drawings, the present implement comprises a transversely-elongated hopper 5, which is mounted upon an axle 6, to which is connected a tongue 7 through the medium of hounds 8. In the bottom of the hopper is formed a transverse series of openings 8', through which the seeds are dropped. Depending from the under side of the hopper is a series of conductors 9, corresponding to the openings and through which the seeds pass from the openings into the furrows that are opened in the usual manner. The bottom of the hopper is double, and the perforations 8' are formed in the lower member of the bottom, the upper member of the bottom having a transverse series of perforations 10 therein which correspond to and are offset laterally with respect to the openings 8', so that the openings 8' and 10 are out of registration.

Between the upper and lower members of the bottom is disposed a slide 11, having a series of perforations 12 therein, and which slide when reciprocated registers its perforation with the perforations 8' and 10 alternately, so that seeds may pass from the hopper through the perforations 10 into the perforations 12 and will be carried in said perforations until the latter are moved into registration with the perforations 8', when the seeds will be precipitated from the hopper through the boots of the drills and into the ground. One end of the slide 11 projects from the end of the hopper, and its extremity is beveled, as shown at 13, for a purpose to be presently explained.

At one end of the axle 6 is a supporting-wheel 14 of ordinary form, while mounted rotatably upon the other end of the axle is a supporting-wheel 15, having an elongated hub 16, extending in the direction of the hopper. Upon the hub 16 is splined a striking-wheel 17, having a cam 18 on its face adjacent to the hopper and which cam is disposed to strike the beveled end of the slide and press the latter longitudinally as the wheel rotates. This inward movement of the slide by the cam serves to register its openings with the openings 8', the openings of the slide normally registering with the openings 10, in which position they are held yieldably by means of the spring 19, disposed against the end of the slide opposite to the bevel.

The operating-wheel 17 is held with its cam in operative relation to the slide by means of a lever 20, which is pivoted to a bracket 21 on the hopper and one end of which lever is forked and engaged in the circumscribing-groove 22 of the hub of the operating-wheel. A hand-lever 23 is mounted upon the hopper in convenient relation to the seat 24, and this hand-lever is connected, by means of the rod 25, with the lever 20, so that as the hand-lever is shifted the operating-wheel is moved toward and away from the end of the slide 11, so that its cam may lie in or out of operative relation to the slide. It will be understood that if the cam 18 strikes the beveled end face 13 of the slide 11 near to the hopper a greater longitudinal movement will be given to the slide by the action of the cam than when it strikes the beveled face near to the outer end of the latter, and thus by sliding the wheel 17 toward and away from the end of the hopper the cam may be caused to push the slide 11 to a greater or lesser extent. When the slide 11 is moved to such an extent that its perforations 12 register accordingly with the openings 8', then the entire contents of the perforations 12 will be precipitated through the members 9, and if the slide be moved so that only portions of its perforations lie above the openings 8' then only a part of the contents of the perforations 12 will be discharged therefrom. Therefore the provision of means for causing a greater or lesser longitudinal movement of the slide provides for determining the rate of feed from the hopper through the members 9. A notched segment 26 is provided for the hand-lever, so that the latter may be held in different positions to hold the operating-wheel in corresponding positions relative to the normal position of the end of the dropping-slide 11, so that more or less movement may be given to the slide and a greater or lesser quantity of seed dropped, as will be understood.

In practice modifications of the specific construction shown may be made and any suitable materials and proportions may be used for the various parts without departing from the spirit of the invention.

What is claimed is—

A seeding-machine comprising a hopper having discharge-openings in its bottom, a dropping-slide mounted to cover and uncover said openings and having one end beveled, means for holding a slide normally and yieldably in position to cover said openings, supporting-wheels for the hopper, a striker-wheel carried by and rotatable with one of the supporting-wheels and having a cam on its face, said striker-wheel being movable with its cam into position to strike the bevel at different points of the length thereof, and means for holding the striker while at different points of its sliding movement.

In testimony whereof I affix my signature in presence of two witnesses.

WILLIAM M. GIBBS.

Witnesses:
   F. M. ACKLEY,
   P. T. BARRETT.